United States Patent [19]
Nojima et al.

[11] Patent Number: 5,572,105
[45] Date of Patent: Nov. 5, 1996

[54] STEPPING MOTOR CONTROL METHOD INCLUDING VARYING THE NUMBER OF SPLIT SECTIONS IN ONE STEP DRIVE PERIOD OF A STEPPING MOTOR

[75] Inventors: Takashi Nojima, Tokyo; Akira Miyakawa, Yokohama; Soichi Hiramatsu, Hachioji; Hideki Yamaguchi, Yokohama; Hiroyuki Inoue, Yokohama; Kenji Kawazoe, Yokohama; Tetsuya Ishikawa, Yokohama; Hitoshi Nakamura, Kawasaki; Akira Kida; Hideaki Kawakami, both of Yokohama, all of Japan

[73] Assignee: Canon Kabushiki Kaisha, Tokyo, Japan

[21] Appl. No.: 363,012

[22] Filed: Dec. 23, 1994

[30] Foreign Application Priority Data

Dec. 27, 1993 [JP] Japan ..................... 5-331782

[51] Int. Cl.$^6$ .................................. G05B 19/40
[52] U.S. Cl. ................. 318/696; 318/599; 318/603
[58] Field of Search .................... 318/696, 685, 318/560, 599, 603, 636, 606, 607, 608

[56] References Cited

U.S. PATENT DOCUMENTS

3,992,657 11/1976 Akamatsu ..................... 318/696
4,326,278 4/1982 Shida et al. ................... 318/696
4,625,667 12/1986 Hammermann ................. 318/685
5,111,349 5/1992 Moon .......................... 318/560
5,150,030 9/1992 Ito et al. .
5,327,063 7/1994 Miyakawa .

*Primary Examiner*—John W. Cabeca
*Attorney, Agent, or Firm*—Fitzpatrick, Cella, Harper & Scinto

[57] ABSTRACT

A device for controlling the power supplied to windings of a stepping motor includes a pulse generator for splitting one step drive period of the motor into a plurality of sections, the number of sections and increasing or decreasing depending upon the drive frequency. The pulse generator, also sets the duty cycle of a pulse applied to the motor. The device also includes a stepping motor drive circuit for exciting each phase of the motor with a current determined by the duty cycle of pulse, and a duty changing device for changing the duty cycle for each of plural sections in one excitation phase of the stepping motor, wherein a current wave input into the motor can be maintained as a sinusoidal wave from low-speed rotation to high-speed rotation of the motor by changing the number of sections in excitation depending upon serial drive operations, thereby achieving motor control with less rotation inconsistencies and less noise.

6 Claims, 8 Drawing Sheets

STEPPING MOTOR CONTROL METHOD INCLUDING VARYING THE NUMBER OF SPLIT SECTIONS IN ONE STEP DRIVE PERIOD OF A STEPPING MOTOR

BACKGROUND OF THE INVENTION

1. Field of the Invention

The present invention relates to a method for drive-controlling a stepping motor, and more particularly to a control method of controlling a stepping motor suitable for driving a stepping motor with means of ramp up or down etc. or for constant-speed drive at a plurality of speeds.

2. Related Background Art

Stepping motors have widely been used recently as a drive source for industrial devices because of their excellent positioning accuracy of rotation. Particularly, they are popularly used as a driving motor in business machines for use in the office, i.e., in so-called OA (office automation) devices.

The constant-voltage drive is a typical example of the drive method of such stepping motors. This method is widely used because its circuit structure is simplest and inexpensive. With an increase in the drive frequency thereof the method, however, becomes affected by the inductance of the motor winding of the motor so as to delay the current rise of motor winding, decreasing a the torque generated during high-speed rotation, and inhibiting high-speed rotation.

In contrast, the constant-current drive method is known as a drive method supporting high-speed rotation of the motor. This drive method is a method in which a voltage for keeping the time constant of the motor winding small is applied, a current flowing in the motor winding is detected in the form of the winding inductance, and the current is switched on and off through a switching device of a transistor so as to keep the current constant at a set value. However, this circuit is complicated and expensive though it achieves the high-speed rotation. Further, in the case of stepping motors, motor vibration occurs during changeover of the drive and noise is generated when the rotation speed is changed while keeping the current value constant, which requires that the current be changed to a value suitable for each rotational speed, thus necessitating an additional circuit therefor.

Still another driving method, known as an advanced drive method, is a control method comprising the steps of attaching an encoder having an accuracy above the resolution of the motor to a shaft of the motor, changing over the phases of the motor in synchronization with a motion of the motor, based on the detection information from the encoder, and determining the rotation speed in such a manner that the speed is changed by a duty ratio while chopping the voltage or current. According to this method, proper changeover of phases can be done even if the rotation speed of motor changes. Thus, this method can avoid the so-called out-of-step state. Further, the rotation frequency becomes one according to the power to the winding, thereby suppressing the generation of noise. However, the number of circuit parts including the encoder of the motor is large, thereby increasing the cost of the motor.

Moreover, because the changeover of excitation of the motor is carried out on a digital basis in constant-voltage control for applying a constant voltage to the winding of the motor, in the constant-current method by the current detection of winding, inductance and the closed loop control as described above, the current applied to the motor winding becomes nearly rectangular, thereby tending to generate vibration or noise.

Thus, an attempt has been made to develop a method to change the amplitude of the phase current so that the current applied to the motor winding did not become rectangular, thereby applying a current in the form, for example of a sinusoidal wave.

Specifically, the stepping motor drive method suggested in U.S. Ser. No. 08/099007 is such an arrangement that one excitation period of the motor is split into a plurality of sections of a preset number by pulse generating means which can set a duty ratio by firmware in order to control the power supplied to the winding of the motor, and such that the amount of power supplied to the winding of the motor, i.e., the pulse duty is preliminarily set by a program in the firmware so as to perform motor control in an open loop, whereby efficient driving can be performed while supplying the power as needed for operation of the motor. Applying this method, another stepping motor drive method is also suggested. In this method driving of the motor is performed with a plurality of sections preliminarily set in one excitation period and the amount of power supplied to the winding, i.e., the pulse duty is set nearly in a sinusoidal shape or the pulse duty is changed for every mode of stopping of the motor holding one state of the motor, ramping up or down of the motor, or constant-speed running of the motor.

In the drive method where the amount of power supplied to the winding of the motor is set nearly in a sinusoidal wave shape with a plurality of sections preliminarily set in one excitation period, the current flowing in the motor is detected by current detecting means similar to that in the above-described constant-current control method and the current is controlled to be a value set within each range of a section in the plurality of sections split in the above preset split number. The same operational effect can also be attained by the closed loop control.

There is also a drive method called through up control, in which the stepping motor is started at a low pulse rate in a self-starting frequency region, and a great acceleration curve is achieved upon a start of an increase in the pulse rate at an appropriate timing while accelerating a load and a rotor, whereby the load is accelerated up to a high-speed pulse rate of constant speed. In this case, when the method of splitting the one excitation period into a plurality of sections of the preset split number as described above is used, if the split number is arranged as to be appropriate to high-speed pulse rates, a smooth sinusoidal wave cannot be attained at low-speed pulse rates, thereby generating vibration and noise.

Figure 6:
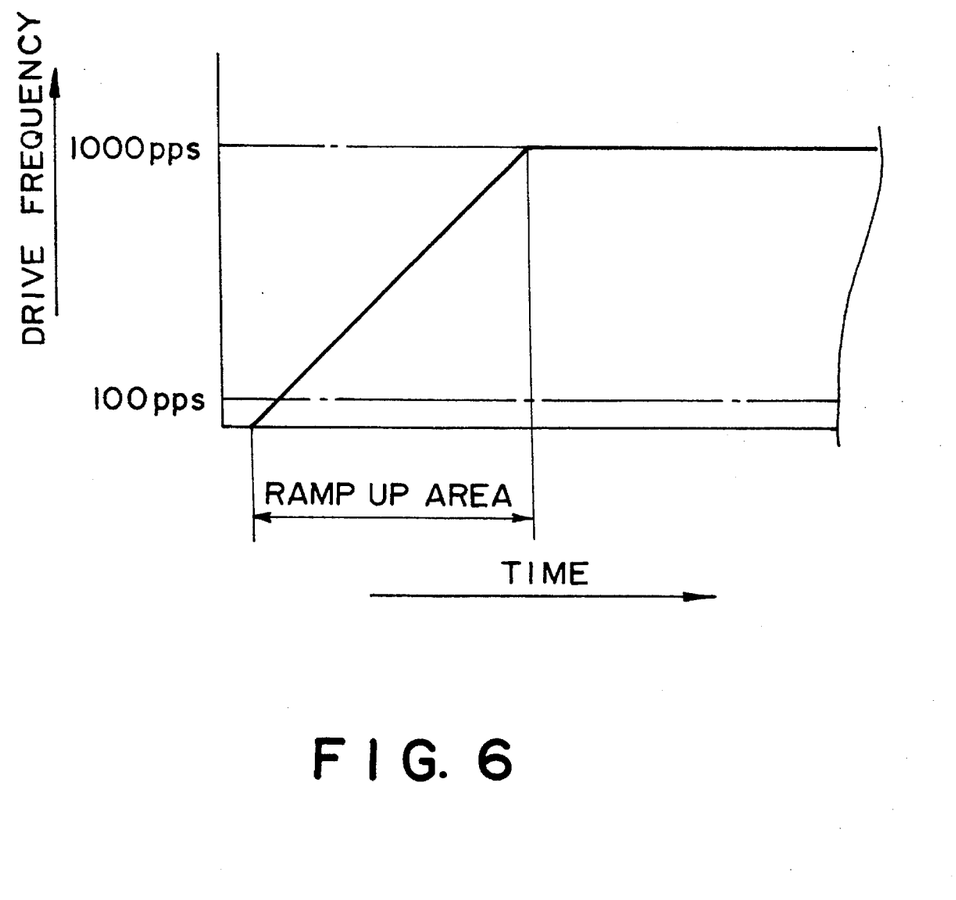
FIG. 6 is a graph to illustrate running speeds of a stepping motor.

For example, when the split number is four in the driving of the motor during ramp up from 100 PPS (changeover cycle of phase excitation: 10 ms) to 1000 PPS (changeover cycle of phase excitation: 1 ms) as shown in FIG. 6, the period of splitting is 1 ms÷4=0.25 ms for 1000 PPS or 1 ms of changeover cycle of the phase excitation as shown in FIG. 6.

Figure 7:
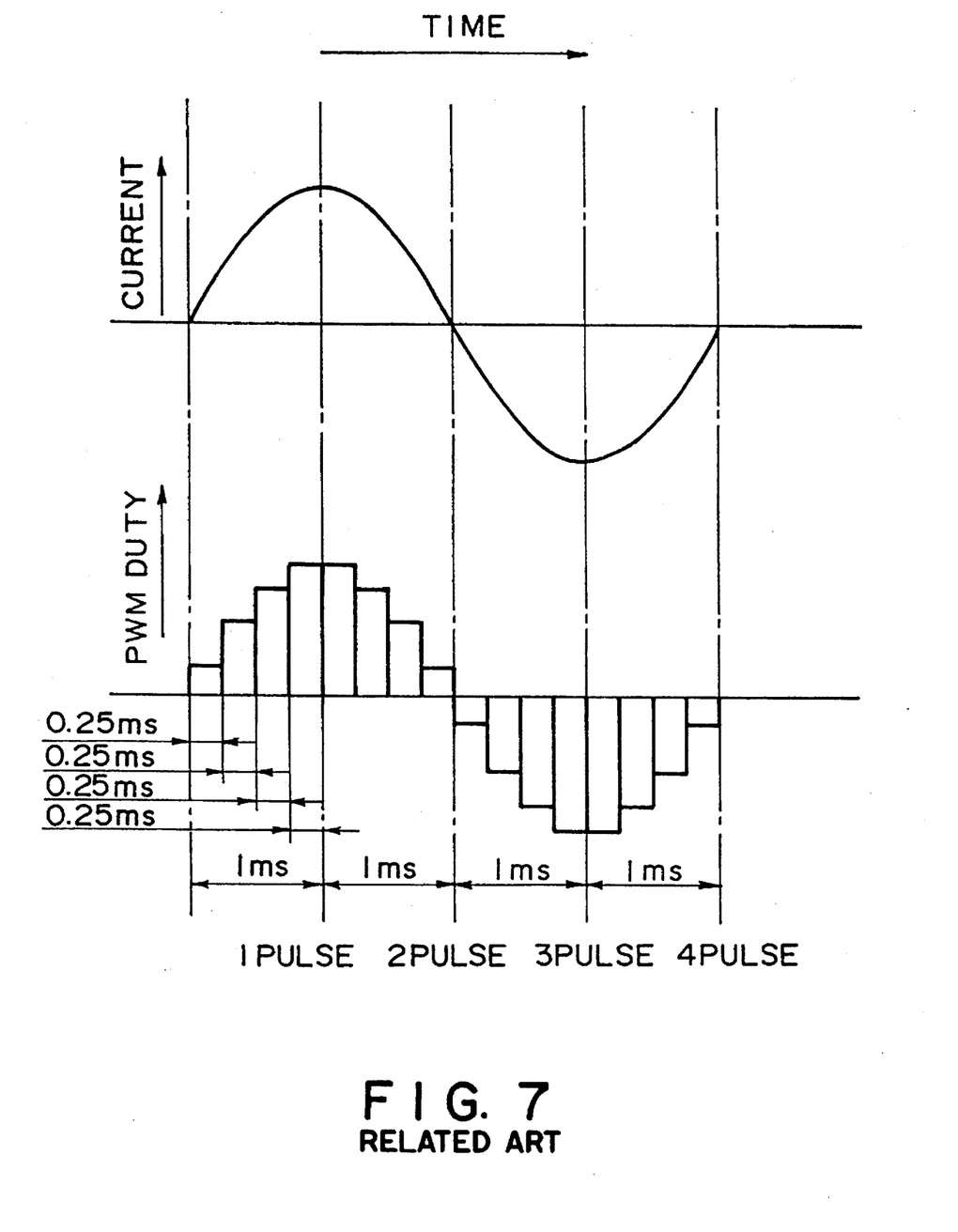
FIG. 7 is a graph to illustrate a current curve and a PWM duty cycle of a conventional example.

FIG. 7 shows a PWM duty cycle and a phase current curve for 1000 PPS. The drawing shows a current setting value in each section. Since the winding of motor has an electric resistance component and an inductance component, the current actually flowing in the winding becomes a smooth sinusoidal wave as shown in FIG. 7 upon drive in such a setting.

Figure 8:
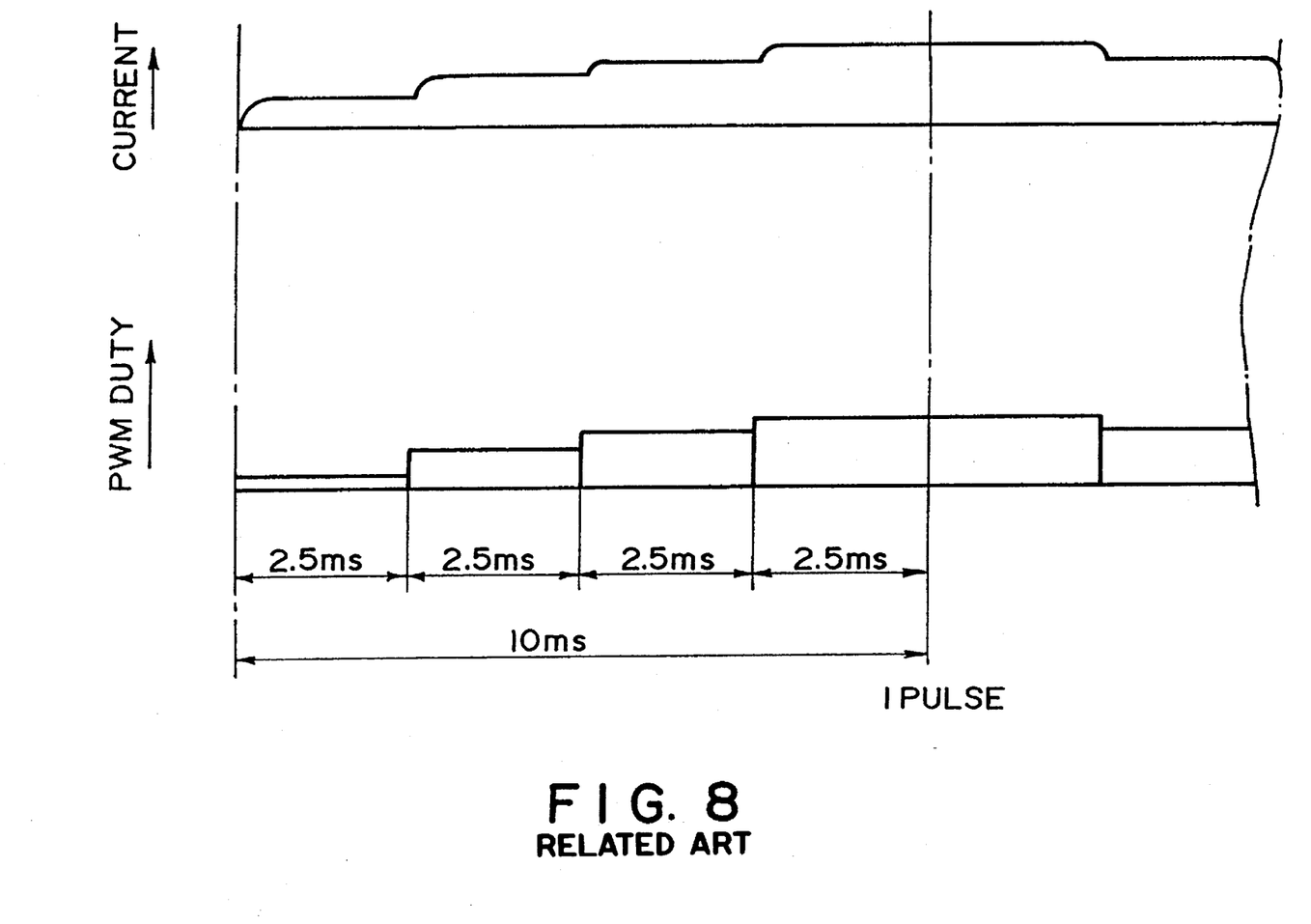
FIG. 8 is a graph to illustrate a current curve and a PWM duty cycle of the conventional example.

In contrast, the cycle of splitting is 10 ms÷4=2.5 ms for 100 PPS or 10 ms of the changeover period of phase excitation as shown in FIG. 8. In this case, because of the long split period, the current flows through even if the winding of motor has the electric resistance component and inductance component, thereby failing to attain a smooth sinusoidal wave.

If the split number is set for example to 40 in order to make the current curve smooth in the low-speed region near 100 PPS, the split cycle becomes 10 ms÷40 =0.25 ms for 100 PPS or 10 ms of the changeover period of phase excitation, which is enough to obtain a smooth current waveform; whereas, the split cycle becomes 1 ms÷40=0.025 ms for 1000 PPS, or 1 ms of the changeover cycle of phase excitation, thereby increasing the load on the hardware or the software control.

SUMMARY OF THE INVENTION

An object of the present invention is to solve the above problems, and thereby to enable a smooth driving of the motor from the low-speed region to the high-speed region by splitting one step drive period of the stepping motor into a plurality of sections depending upon the drive frequency of the stepping motor.

Another object of the present invention is to change the split number of sections within one step drive period of the stepping motor depending upon the drive mode.

Other objects of the present invention will be apparent in the following description of specific embodiments.

DETAILED DESCRIPTION OF THE PREFERRED EMBODIMENTS

The embodiments of the present invention will be described in detail by reference to the drawings.
(First Embodiment)

Figure 1:
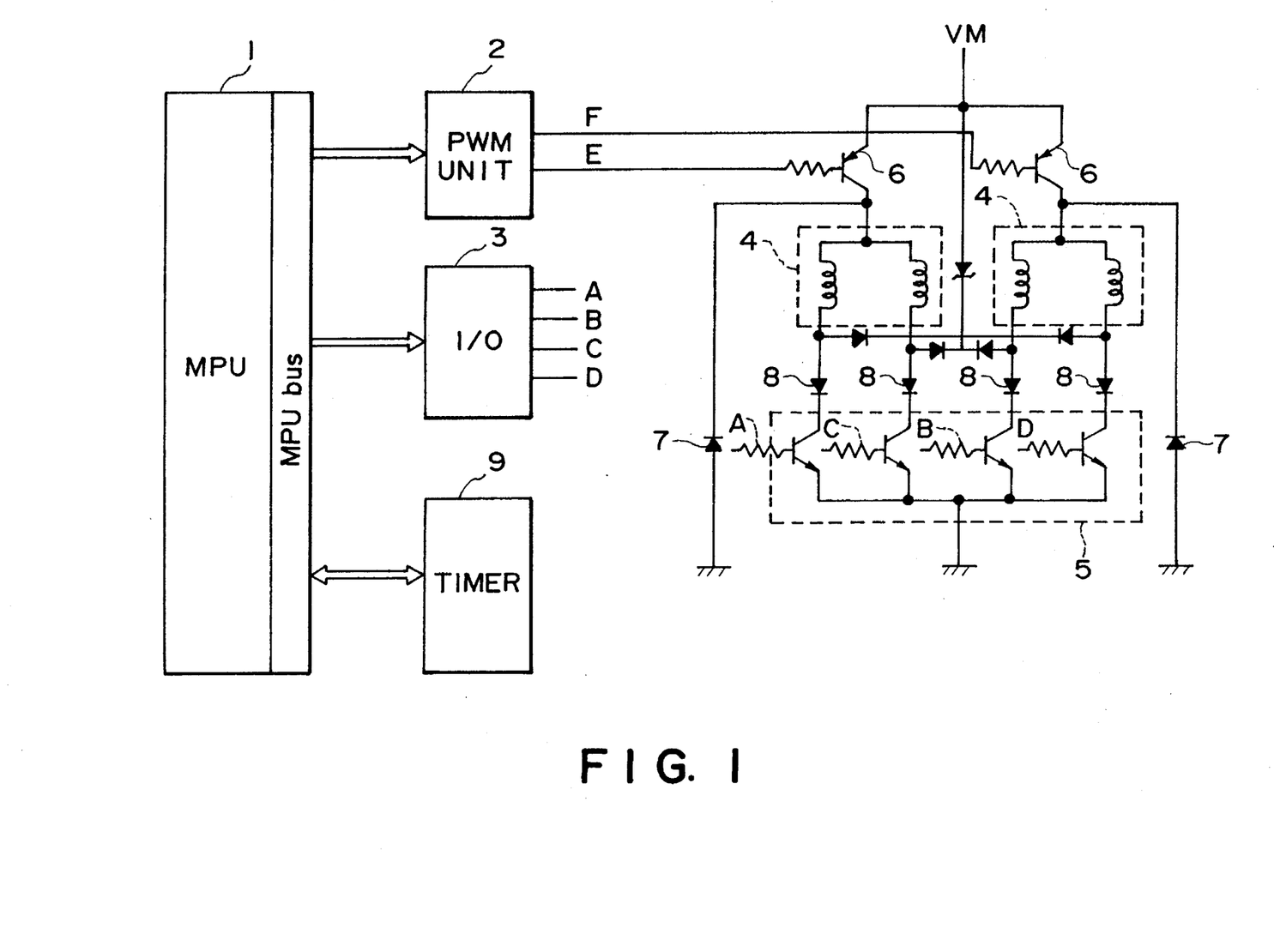
FIG. 1 is a circuit diagram to show a circuit layout for a stepping motor control method in the first embodiment of the present invention.

FIG. 1 shows a circuit layout of a motor control apparatus in the first embodiment of the present invention. In FIG. 1, reference numeral 1 designates an MPU (micro processor) for controlling the drive of the motor, 2 denotes a pulse width modulator (hereinafter referred to as a PWM unit) connected to an MPU bus of MPU 1 and arranged to be capable of setting a frequency and a duty cycle thereof, and 3 denotes an output port (I/O port) connected to the MPU bus of MPU 1 and generating a coded signal for driving the stepping motor. Numeral 4 denotes a stepping motor having a unipolar connection of two phases, and 5 denotes current control transistors for controlling the current of the winding in the stepping motor 4 with an output from the I/O port 3.

Numeral 7 denotes flywheel diodes for forming a path for the current to flow when the current control transistors 6 are off, 8 denotes diodes for preventing a backward current due to an induced voltage in the coil, and 9 denotes a programmable timer unit connected to the MPU bus of MPU 1.

Figure 2:
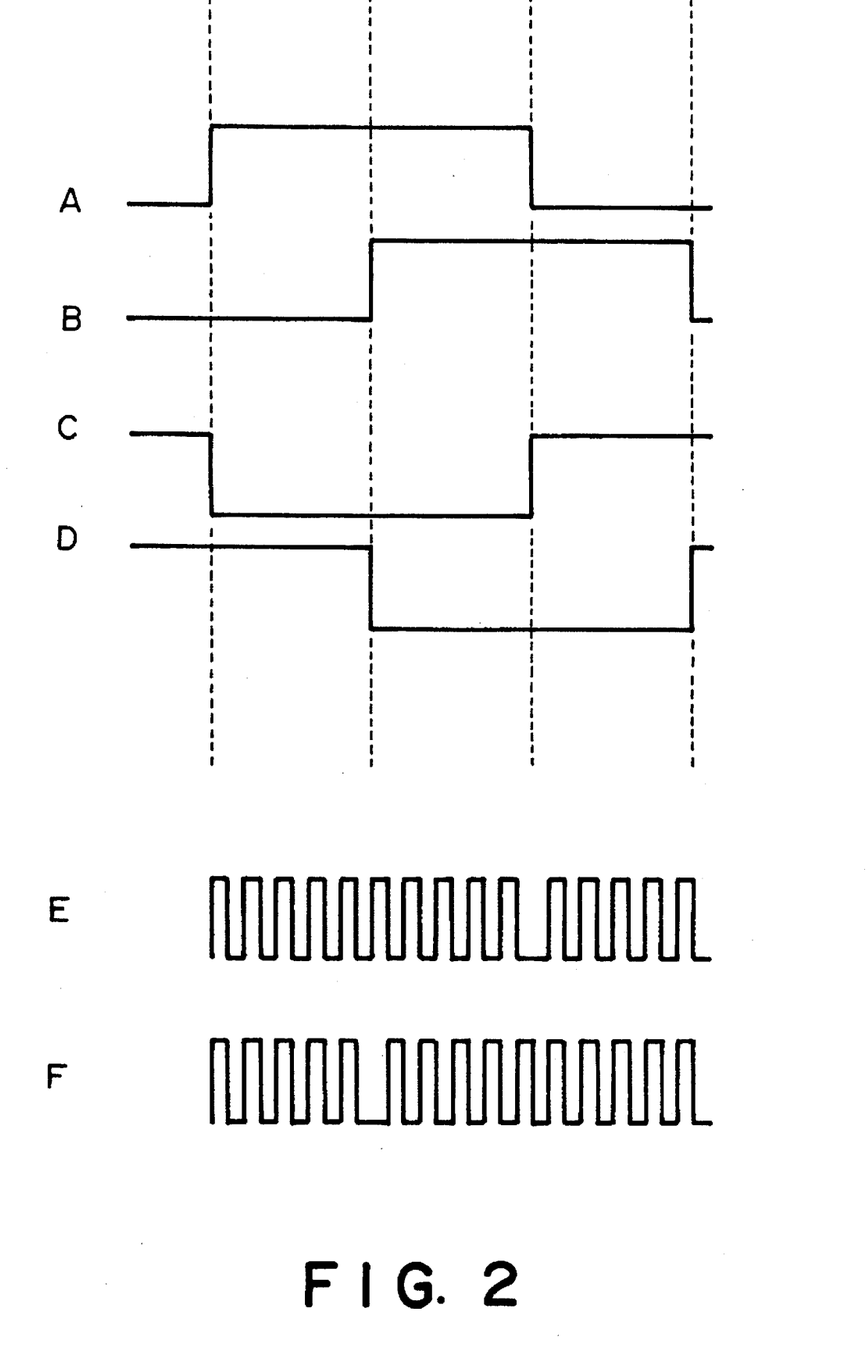
FIG. 2 is a timing chart to show timings of signals in the first embodiment of the present invention.

In the above structure, MPU 1 generates signals for a two-phase-on drive operation as shown in FIG. 2, necessary for driving of stepping motor 4, and outputs them through the output port 3. The signals are output under the control of software in MPU 1 while adjusting the timings of the change of the outputs by the timer unit 9. A control of each mode, such as acceleration, high and constant speed, low and constant speed, deceleration, etc. is performed depending upon the change time.

The MPU 1 sets the PWM unit 2 to output pulses at a constant frequency, for example at a frequency above 20 kHz higher than the hearing range of the human ear, with a duty cycle preliminarily determined for each excitation, in a manner similar to a step motor table of a motor drive.

An example of outputs of PWM unit 2 is shown by E and F in FIG. 2. The outputs E, F turn the current control transistors 6 on to supply a current to the stepping motor 4. The flywheel diodes 7 are made active when the outputs are on, whereas the power stored in the inductance portion of the winding in the stepping motor 4 is expelled when they are off. Repeating these steps, a current of a value proportional to the output pulse duty cycle from the PWM unit 2 can be cause to flow through a selected winding in the stepping motor 4.

Figure 3:
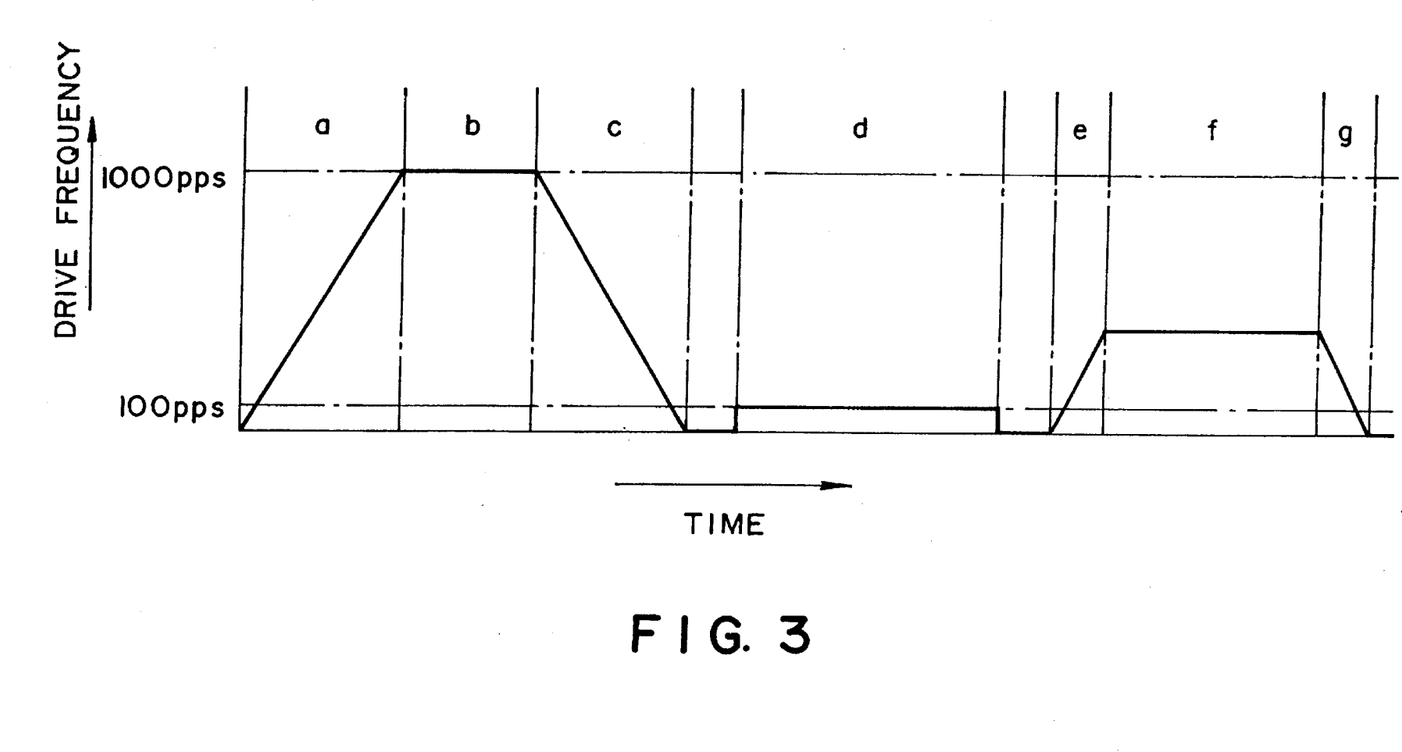
FIG. 3 is a graph to illustrate running speeds in the first embodiment of the present invention.

FIG. 3 shows an example of a speed change of the stepping motor 4 at this time. In FIG. 3, a represents a ramp up mode, b represents a high and constant speed mode, c represents a high-speed ramp down mode, d represents a slow speed mode, e represents a low-speed ramp up mode, f represents a low and constant speed mode, and g represents a low-speed ramp down mode.

Since the value of PWM necessary for rotation at a certain frequency of stepping motor 4 depends upon the power source voltage, and the inductance and resistance of the winding of the stepping motor, the necessary minimum value of the power source voltage in each mode can be set to a PWM value taking variations into account, within the range of variations of the above factors. The necessary torque is different for the above respective modes. Accordingly, the power necessary for operation of stepping motor 4 can be supplied by outputting pulses with duty cycles according to the necessary torque in each mode.

The value of PWM herein reduces vibration and noise of the motor, and a curve of a current flowing through the motor approximates a sinusoidal wave by splitting the excitation phase period into a plurality of sections and setting the duty cycle to an appropriate value in each section. The number of sections is 40 for below 500 PPS, while it is four for 500 or more PPS.

Figure 4:
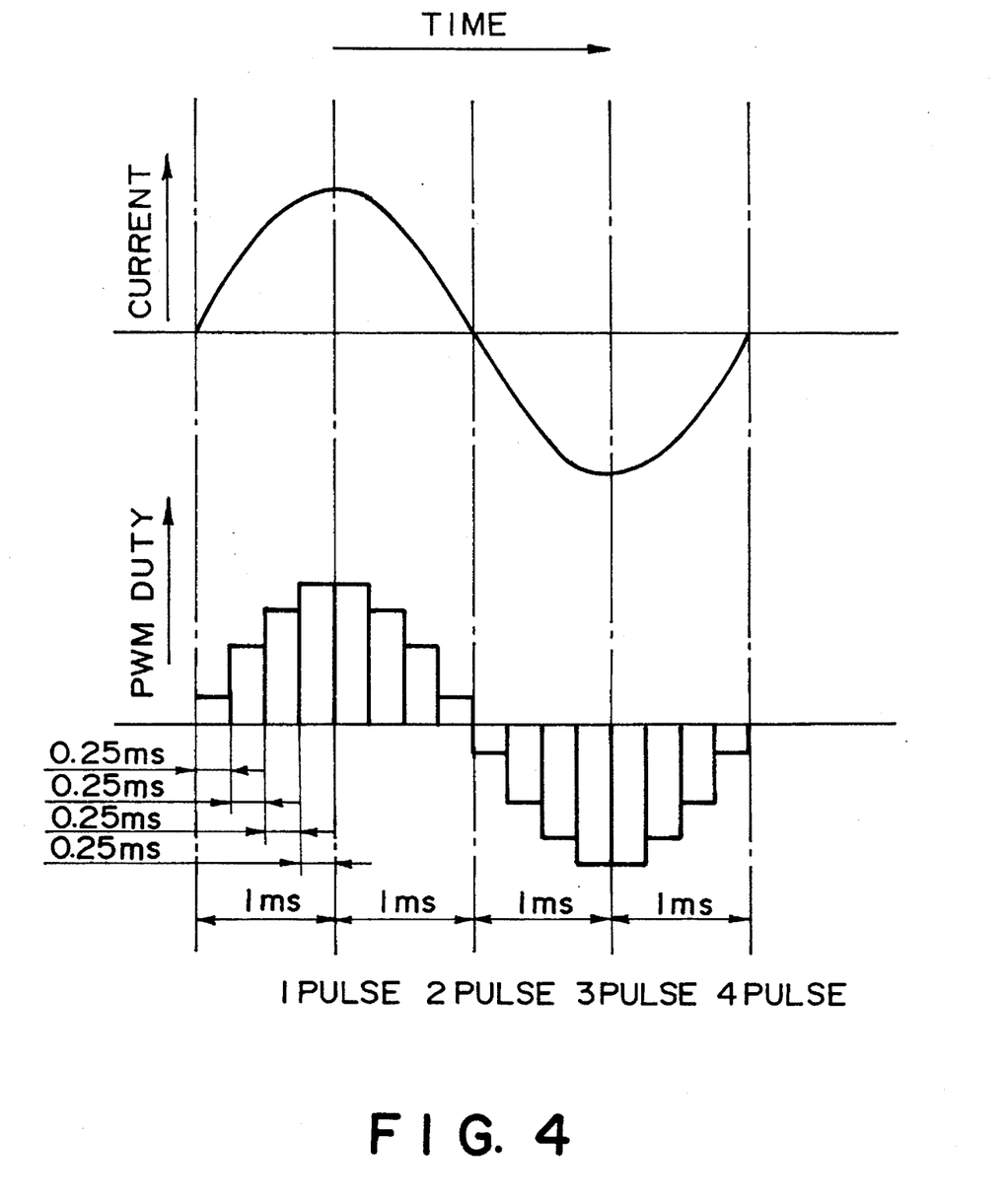
FIG. 4 is a graph to show a current curve and a PWM duty cycle in the first embodiment of the present invention.
Figure 5:
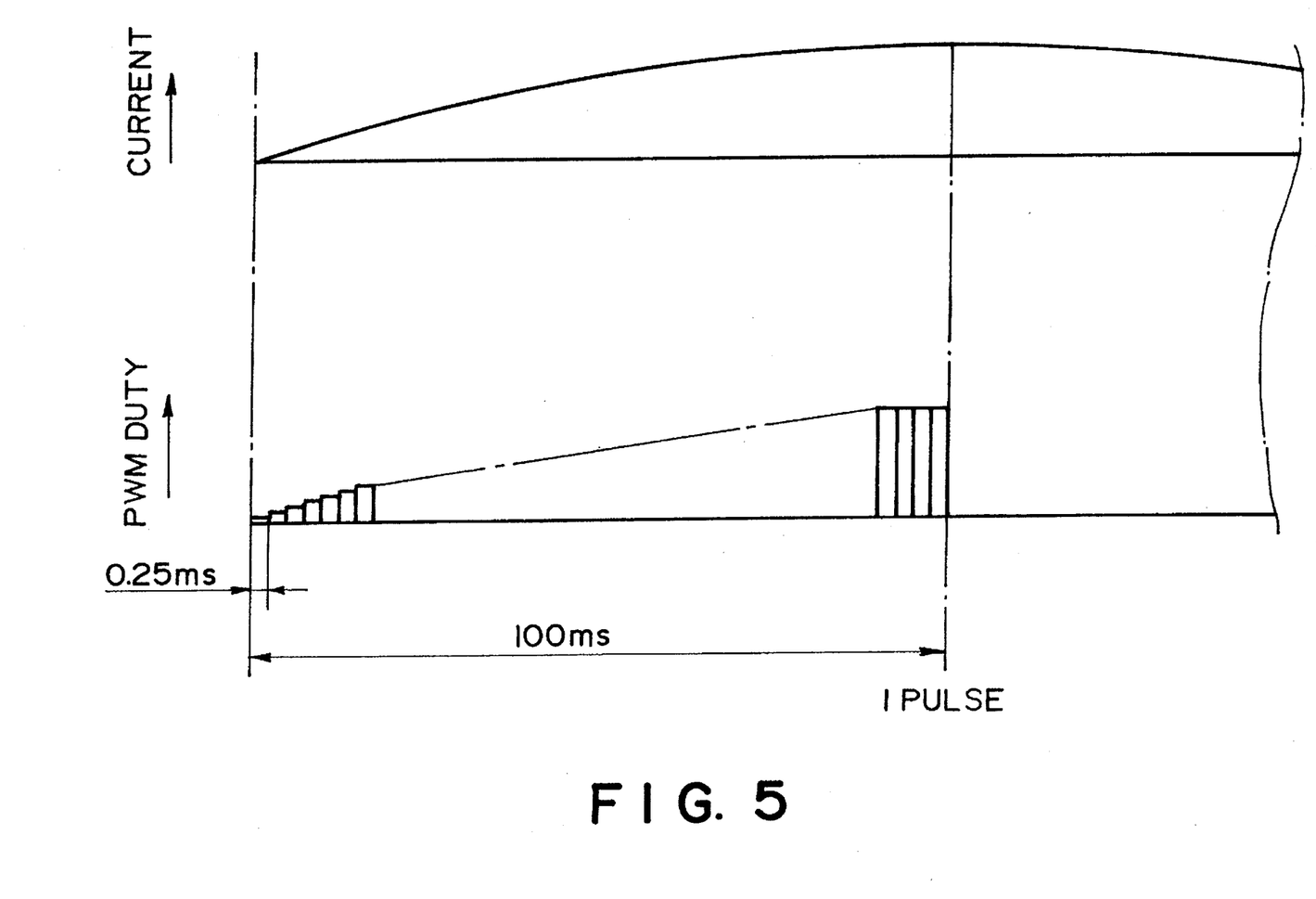
FIG. 5 is a graph to show a current curve and a PWM duty cycle in the first embodiment of the present invention.

For example, in the case of the slow speed mode of d, where the drive frequency is below 500 PPS, specifically 100 PPS, the split period is 10 ms÷40=0.25 ms for 100 PPS, or 10 ms for the changeover period of the phase excitation. The PWM duty cycle and the current curve through the motor 4 are as shown in FIG. 4. Also, in the case of the high and constant mode of b, where the drive frequency is above 500 PPS, specifically 1000 PPS, the split period is 1 ms÷4= 0.25 ms for 1000 PPS, or 1 ms for the changeover period of the phase excitation. The PWM duty cycle and the current curve through the motor are as shown in FIG. 5.

The above number of PWM sections, of course, changes for the ramp up mode of a, the high-speed ramp down mode of c, the low-speed ramp up mode of e, and the low-speed ramp down mode of g.

As described, the number of sections of PWM is changed depending upon the drive frequency of the motor, whereby a smooth sinusoidal current wave can be caused to flow at any frequency. Although the above description shows an example in which the change of the split number was determined by whether the frequency was below 500 PPS or not less than 500 PPS, this determination way may be modified to perform changeover between a plurality of split numbers, for example 10 sections for 0 PPS to 300 PPS, 5 sections for 301 PPS to 600 PPS, and 3 sections for 601 or more PPS.

(Second Embodiment)

The first embodiment as described above was so arranged that the split number of PWM was digitally changed with the border of 500 PPS, but the present embodiment is so arranged that the changeover is effected with the changeover period of PWM being fixed for example at 0.2 ms. In this method, the split number is determined in inverse proportion to the drive frequency. For example, the split number is 10 ms÷0.2 ms=50 for 100 PPS, or 10 ms for the changeover period of phase excitation, while the split number is 1 ms÷0.2=5 for 1000 PPS, or 1 ms for the changeover period of phase excitation in the case of 1000 PPS.

Since the split number gradually changes in this method, rotation inconsistencies or torque inconsistencies of the motor rarely occur, and the operation can be executed by a simple algorithm in software, thereby improving the processing speed and saving the memory.

(Third Embodiment)

Also, the first embodiment as described above was so arranged that the changeover of the split number was made at a specific drive frequency, while another effective method is one in which the split number is determined as one for each of the speed modes shown in the first embodiment and is changed over depending upon a selected speed mode.

As described above, the present invention can provide a motor control apparatus having pulse generating means which can set a duty cycle for each pulse, a stepping motor drive circuit for exciting each phase by a current determined by the duty cycle for each pulse, and duty changing means for changing the duty cycle for each of a plurality of sections in one excitation period of stepping motor, wherein a current wave inputted into the motor is a smooth sinusoidal wave in the range of from low-speed rotation to high-speed rotation by changing the split number in an excitation period depending upon serial drive operations, thereby achieving motor control with less rotation inconsistencies and less noise than previously.

What is claimed is:

1. A stepping motor control device comprising:

a stepping motor;

a drive circuit for driving said stepping motor, said drive circuit having a changeover circuit which changes an excitation phase of excitation current supplied to an excitation coil of said stepping motor whenever a step drive signal is applied thereto and having a switching circuit which controls the excitation current supplied to the excitation coil of said stepping motor in accordance with an applied pulse signal with a predetermined duty cycle;

a stepping signal generating portion for generating the step drive signal in accordance with a driving frequency for step-driving said stepping motor, said stepping signal generating portion applying the step drive signal to said changeover circuit of said drive circuit;

a control portion for splitting one step drive period of said stepping motor into a plurality of sections in accordance with the driving frequency of said stepping motor, said control portion varying the number of said split sections in accordance with the driving frequency of said stepping motor; and a pulse signal generating portion for generating said pulse signal with a predetermined duty cycle for each of said split sections and for applying said pulse signal to said switching circuit of said drive circuit.

2. A device according to claim 1, wherein said control portion lowers the number of the sections obtained by splitting one step drive period of said stepping motor into a plurality of sections as the drive frequency of said stepping motor increases.

3. A device according to claim 1, wherein a split period when one step drive period of said stepping motor is split into a plurality of sections, is not more than 1 ms.

4. A control method of stepping motor according to claim 1, wherein said control portion sets the number of the sections obtained by splitting one step drive period of said stepping motor into a plurality of sections to be a first section number when the drive frequency of said stepping motor is less than a predetermined value, and said control portion sets the number of sections to be a second section number smaller than the first section number when the drive frequency is not less than the predetermined value.

5. A stepping motor control device having different drive modes, comprising:

a stepping motor;

a drive circuit for driving said stepping motor, said drive circuit having a changeover circuit which changes an excitation phase of excitation current supplied to an excitation coil of said stepping motor whenever a step drive signal is applied thereto and having a switching circuit which controls the excitation current supplied to the excitation coil of said stepping motor in accordance with a pulse signal with a predetermined duty cycle;

stepping signal generation means for generating the step drive signal in accordance with a driving frequency for step-driving said stepping motor, said stepping signal generation means applying the step drive signal to said changeover circuit of said drive circuit;

control means for causing said step drive signal generation means to generate the step drive signal having a driving frequency in accordance with the driving mode;

said control means having changing means for splitting one step drive period of the stepping motor into a plurality of sections in accordance with the driving frequency of said stepping motor, said changing means varying the number of said split sections in accordance with the driving mode of said stepping motor; and pulse generating means for generating said pulse signal with a predetermined duty cycle for each of said split sections and for applying said pulse signal to said switching circuit of said drive circuit.

6. A stepping motor control device, comprising:

a stepping motor;

a drive circuit for driving said stepping motor, said drive circuit having a changeover circuit which changes an excitation phase of excitation current supplied to an excitation coil of said stepping motor whenever a step drive signal is applied thereto and having a switching circuit which controls the excitation current supplied to the excitation coil of said stepping motor in accordance with a pulse signal with a predetermined duty cycle;

stepping signal generating means for generating the step drive signal in accordance with a driving frequency for step-driving said stepping motor, said stepping signal generating means applying the step drive signal to said changeover circuit of said drive circuit;

changing means for splitting one step drive period of said stepping motor into a plurality of sections in accordance with the driving frequency of said stepping motor, said changing means varying the number of said split sections in accordance with the driving frequency of said stepping motor; and pulse generation means for generating the pulse signal with the predetermined duty cycle in accordance with a preset cycle and for applying the pulse signal to said switching circuit of said drive circuit.

* * * * *

UNITED STATES PATENT AND TRADEMARK OFFICE
CERTIFICATE OF CORRECTION

PATENT NO. : 5,572,105       Page 1 of 2
DATED : November 5, 1996
INVENTOR(S) : TAKASHI NOJIMA, ET AL.

It is certified that error appears in the above-indentified patent and that said Letters Patent is hereby corrected as shown below:

ON THE COVER PAGE

[57] ABSTRACT

Line 3, delete "the" (second occurrence).

Line 4, "number of sections and increasing or decreasing" should read --and increasing or decreasing the number of sections--.

COLUMN 1

Line 23, "simplest" should read --simple--.

Line 27, delete "a".

Line 45, "driving" should read --drive--.

UNITED STATES PATENT AND TRADEMARK OFFICE
CERTIFICATE OF CORRECTION

PATENT NO. : 5,572,105
DATED : November 5, 1996
INVENTOR(S) : TAKASHI NOJIMA, ET AL.

It is certified that error appears in the above-indentified patent and that said Letters Patent is hereby corrected as shown below:

COLUMN 2

Line 24, delete "of" (second occurrence)--; and "motor" should read --motor,--.

Signed and Sealed this

Fifteenth Day of April, 1997

*Attest:*

BRUCE LEHMAN

*Attesting Officer*      *Commissioner of Patents and Trademarks*